United States Patent
Nowatari (10) Patent No.: US 10,883,537 B2
(45) Date of Patent: Jan. 5, 2021

(54) TAPERED ROLLER BEARING

(71) Applicant: Shuichi Nowatari, Yokohama (JP)

(72) Inventor: Shuichi Nowatari, Kanagawa (JP)

( * ) Notice: Subject to any disclaimer, the term of this patent is extended or adjusted under 35 U.S.C. 154(b) by 0 days.

(21) Appl. No.: 16/608,664

(22) PCT Filed: Mar. 13, 2018

(86) PCT No.: PCT/JP2018/009701
§ 371 (c)(1),
(2) Date: Feb. 4, 2020

(87) PCT Pub. No.: WO2018/198556
PCT Pub. Date: Nov. 1, 2018

(65) Prior Publication Data
US 2020/0200213 A1 Jun. 25, 2020

(30) Foreign Application Priority Data
Apr. 26, 2017 (JP) ................................ 2017-087270

(51) Int. Cl.
*F16C 33/36* (2006.01)
*F16C 19/36* (2006.01)

(52) U.S. Cl.
CPC .......... *F16C 19/364* (2013.01); *F16C 33/366* (2013.01)

(58) Field of Classification Search
CPC .... F16C 19/305; F16C 19/364; F16C 33/366; F16C 33/4605; F16C 33/4623; F16C 33/4629; F16C 33/4635
See application file for complete search history.

(56) References Cited

U.S. PATENT DOCUMENTS 1,397,142 A * 11/1921 Palmgren .............. F16C 19/364
384/571
2,087,680 A * 7/1937 Wise ..................... F16C 19/364
384/475

(Continued)

FOREIGN PATENT DOCUMENTS

CN 102852969 A 1/2013
DE 102008046224 A1 * 3/2010 ............ F16C 33/585

(Continued)

OTHER PUBLICATIONS

The International Search Report and Written Opinion for PCT/JP2018/009701 dated May 22, 2018.

(Continued)

*Primary Examiner* — Phillip A Johnson
(74) *Attorney, Agent, or Firm* — Kenealy Vaidya LLP (57) ABSTRACT

Provided is a tapered roller bearing (1) subjected to a thrust load and a radial load from a rotation axis (JX). The tapered roller bearing (1) comprises: a plurality of rollers (50) arranged radially between a pair of raceway surfaces (2a, 3a) tilted to one side relative to a plane (P1) perpendicular to the rotation axis (JX); and a retainer (4) disposed between the pair of raceway surfaces (2a, 3a) and having a plurality of pockets (41) for containing the rollers (50). Each of the rollers (50) has: a truncated circular conical roller body (51) having a diameter gradually increasing from the inner side toward the outer side in a radial direction (DD); and a circular conical roller outer section (52) continuous with the outer side of the roller body (51) in the radial direction (DD) and tapered toward the outer side in the radial direction (DD). The inner sides of the rollers (50) in the radial direction (DD) are shaped to conform to the shape of the inner walls of the pockets (41) and are not rotatably supported by the pockets (41), and the outer sides of the rollers (50) in the radial direction (DD) are in point-contact with the inner walls of the pockets (41).

3 Claims, 7 Drawing Sheets (56) References Cited

U.S. PATENT DOCUMENTS

| | | | | | |
|---|---|---|---|---|---|
| 2,130,379 | A | * | 9/1938 | Chilton | F16C 33/60 384/565 |
| 2,545,969 | A | * | 3/1951 | McNicoll | F16C 19/36 384/572 |
| 3,128,134 | A | * | 4/1964 | Dorl | F16C 19/49 384/454 |
| 3,675,978 | A | * | 7/1972 | McKelvey | F16C 33/6637 384/463 |

FOREIGN PATENT DOCUMENTS

| | | |
|---|---|---|
| DE | 10 2009 042 941 A1 | 3/2011 |
| DE | 10 2011 005 845 A1 | 9/2012 |
| EP | 3 351 815 A1 | 7/2018 |
| GB | 191119446 A * 7/1912 | ............ F16C 19/364 |
| JP | S47-35140 Y1 | 10/1972 |
| JP | H04-32316 U | 3/1992 |
| JP | H10-9257 A | 1/1998 |
| JP | 2000-304038 A | 10/2000 |
| JP | 2010-91007 A | 4/2010 |
| JP | 2017-36831 A | 2/2017 |
| WO | 2017/026353 A1 | 2/2017 |
| WO | 2017/047727 A1 | 3/2017 |
| WO | 2018/198556 A1 | 11/2018 |

OTHER PUBLICATIONS

International Preliminary Report on Patentability for PCT/JP2018/009701 dated Oct. 29, 2019.
Chinese Office Action for the related Chinese Patent Application No. 201880039236.2 dated Aug. 13, 2020.

* cited by examiner

TAPERED ROLLER BEARING

This application is a U.S. national phase filing under 35 U.S.C. § 371 of PCT Application No. PCT/JP2018/009701, filed Mar. 13, 2018, and claims priority under 35 U.S.C. § 119 to Japanese patent application number 2017-087270 filed on Apr. 26, 2017, the entireties of which are incorporated herein by reference.

TECHNICAL FIELD

The present invention relates to a tapered roller bearing that receives a thrust load and a radial load derived from a rotation axis.

BACKGROUND ART

A roller bearing that receives a thrust load and a radial load derived from a rotation axis is provided with a plurality of rollers (rolling elements) arranged radially between a pair of raceway surfaces tilted relative to a rotation axis. Such a roller bearing is inserted between a non-rotative member and a rotative member in, for example, an automobile transmission or a windmill device, and serves to smooth rotation of the rotative member under a thrust force and a radial force derived from a rotation axis. Such a tapered roller bearing is optionally provided with a retainer having a pocket for receiving the roller.

The roller bearing provided with a plurality of rollers arranged radially between a pair of raceway surfaces tilted relative to a rotation axis has a characteristic of causing slippage between the raceway surfaces and the roller on an external periphery side, due to a difference in peripheral velocity (peripheral velocity difference) between an internal periphery side and the external periphery side of the raceway surfaces during use. The slippage may cause inconveniences such as an increase in rotational resistance between the raceway surfaces and the roller due to slide friction, and an increase in friction of the roller and the raceway surfaces on the external periphery side. In order to suppress such inconveniences, a tapered roller bearing provided with a roller having a truncated conical shape (hereinafter, may be also referred to as a "tapered roller") has been used (see Patent Document 1). The tapered roller bearing is capable of suppressing the inconveniences to some degree.

Patent Document 1: Japanese Unexamined Patent Application, Publication No. 2010-091007

DISCLOSURE OF THE INVENTION

Problems to be Solved by the Invention

However, for the tapered roller bearing that receives a thrust load and a radial load derived from a rotation axis, further reduction in friction generated between the tapered roller and the pocket in the retainer, and further smoothing of the rotation of the tapered roller are desired.

An object of the present invention is to provide a tapered roller bearing that receives a thrust load and a radial load derived from a rotation axis, capable of further reducing the friction generated between the tapered roller and the pocket in the retainer, and further smoothing the rotation of the tapered roller.

Means for Solving the Problems

The present invention relates to a tapered roller bearing that receives a thrust load and a radial load derived from a rotation axis, including a plurality of rollers arranged radially between a pair of raceway surfaces tilted to one side relative to a plane perpendicular to the rotation axis, and a retainer disposed between the pair of raceway surfaces and having a plurality of pockets for receiving the rollers, in which: the plurality of rollers each include a roller body having a truncated conical shape gradually increasing in diameter outwardly in a radial direction of the plurality of rollers, and a roller outer section having a conical shape continuous with an outer side of the roller body in the radial direction and tapered outwardly in the radial direction; an inner end of each of the plurality of rollers in the radial direction has a shape conforming to a shape of an interior wall of the pocket and is not pivotally supported by the pocket; and an outer end of each of the plurality of rollers in the radial direction is in point contact with the interior wall of the pocket.

At least an external peripheral surface of each of the plurality of rollers may be formed from a resin.

The plurality of rollers may be each entirely formed from a resin.

Effects of the Invention

The present invention is capable of providing a tapered roller bearing that receives a thrust load and a radial load derived from a rotation axis, capable of further reducing the friction generated between the tapered roller and the pocket in the retainer, and further smoothing the rotation of the tapered roller.

PREFERRED MODE FOR CARRYING OUT THE INVENTION

First Embodiment

Figure 1:
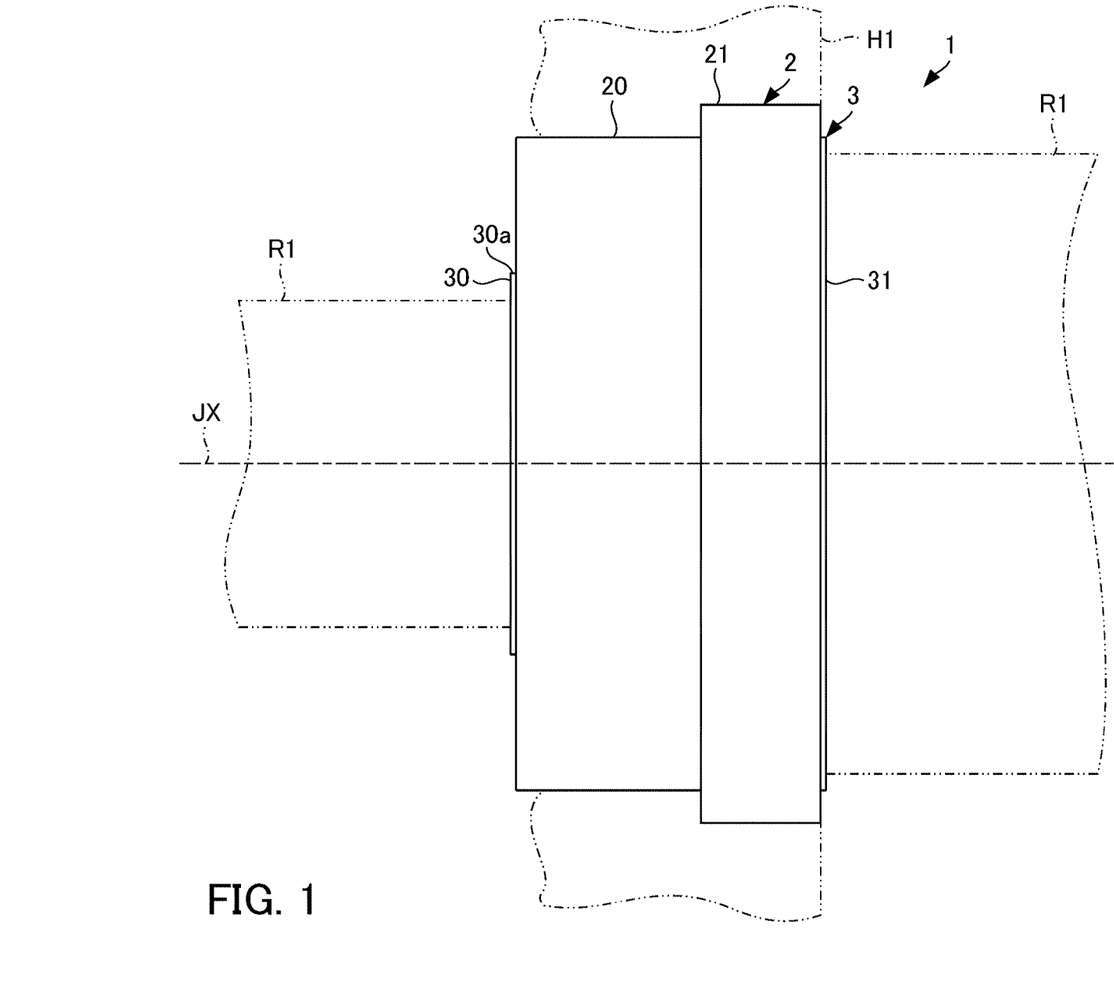
FIG. 1 is a lateral view of a tapered roller bearing 1 according to a first embodiment of the present invention.
Figure 2:
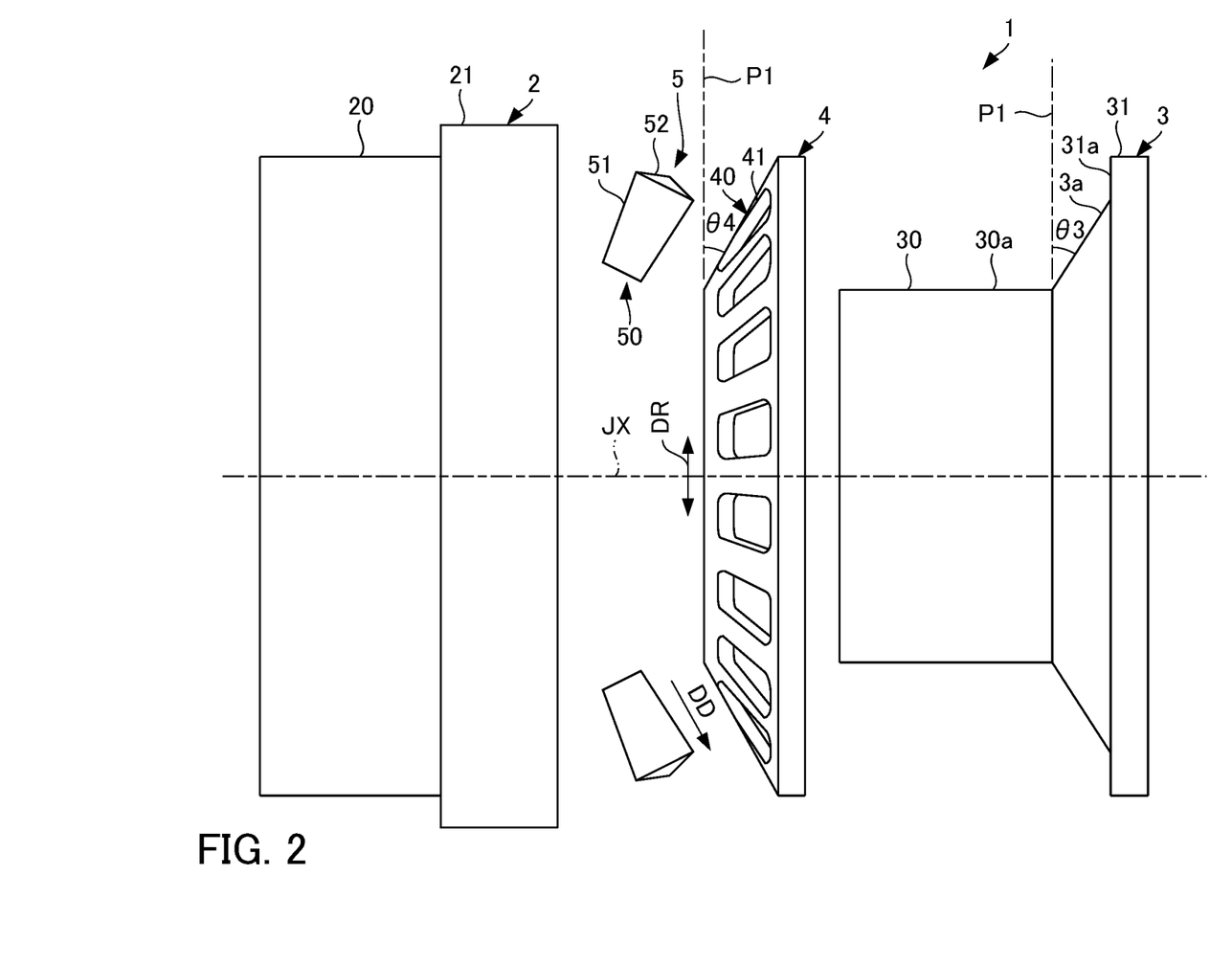
FIG. 2 is an exploded lateral view of FIG. 1.
Figure 3:
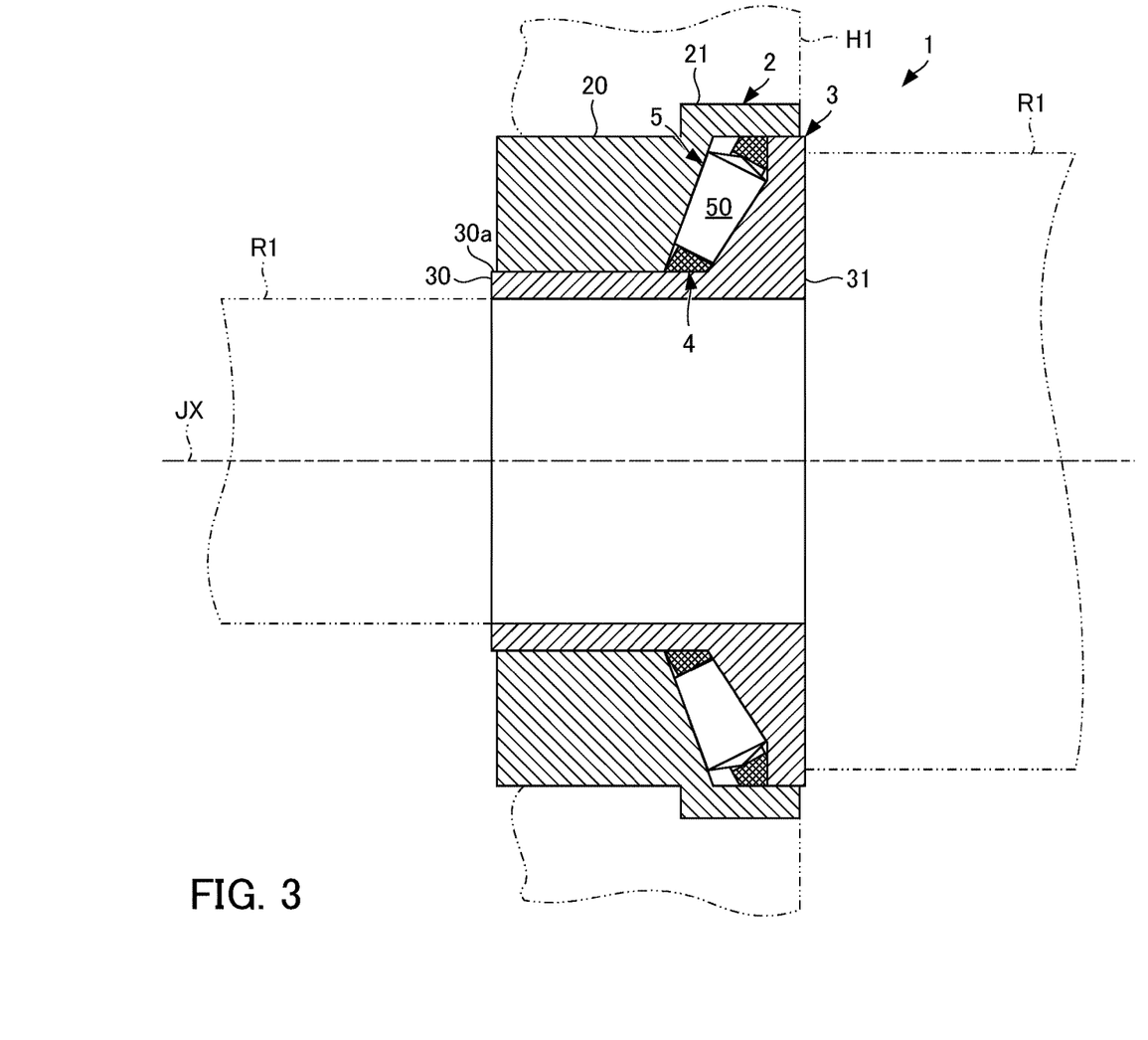
FIG. 3 is a vertical cross-sectional view of FIG. 1.
Figure 4:
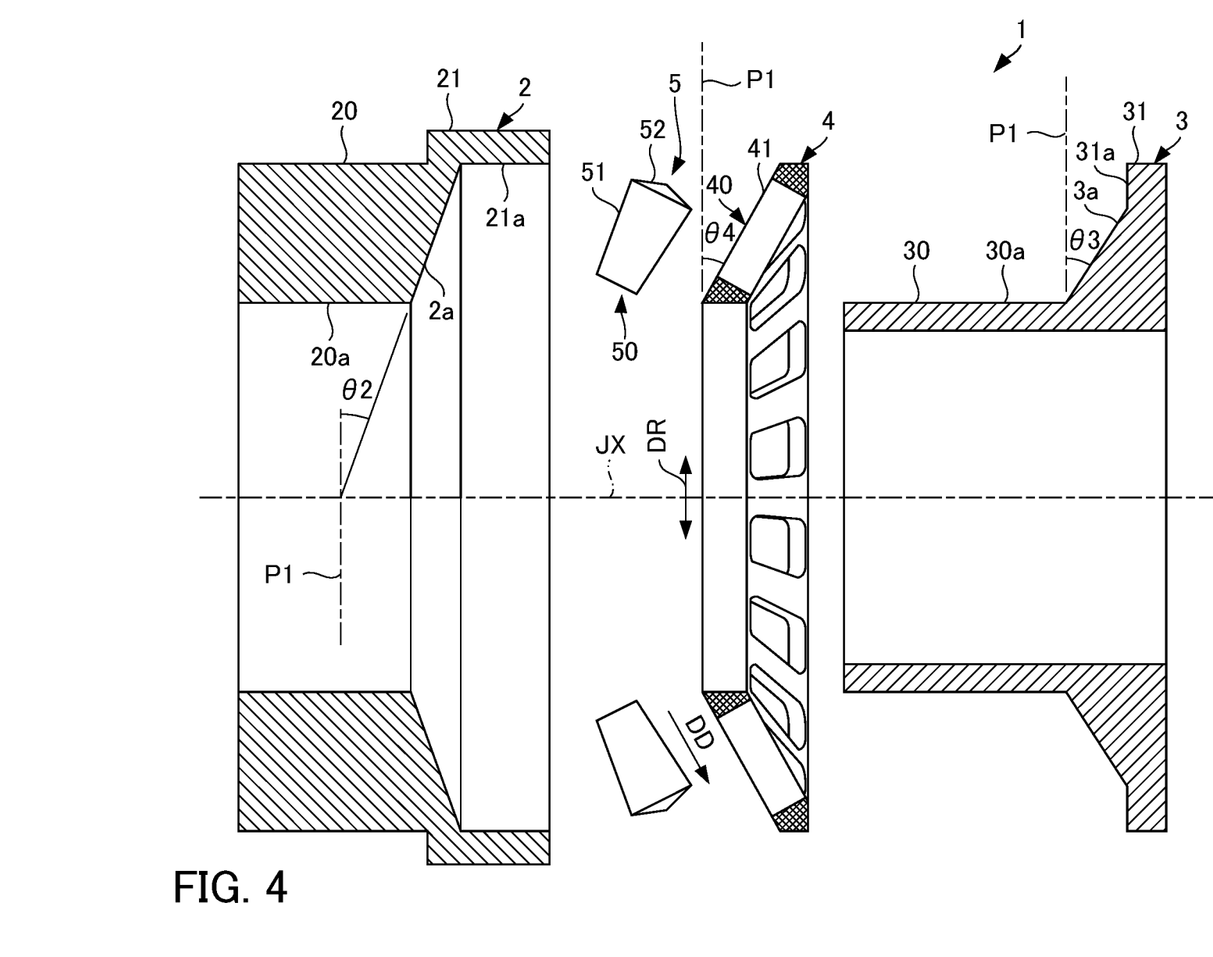
FIG. 4 is an exploded vertical cross-sectional view of FIG. 1.
Figure 5:
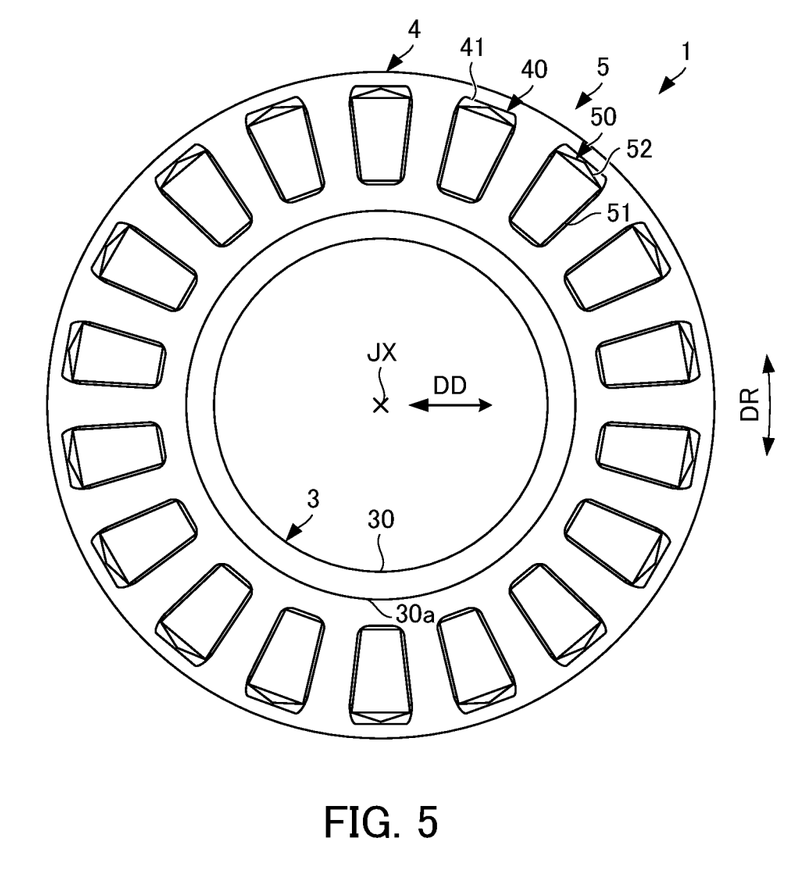
FIG. 5 is a front view of the tapered roller bearing 1 according to the first embodiment, with an outer race 2 being omitted.
Figure 6:
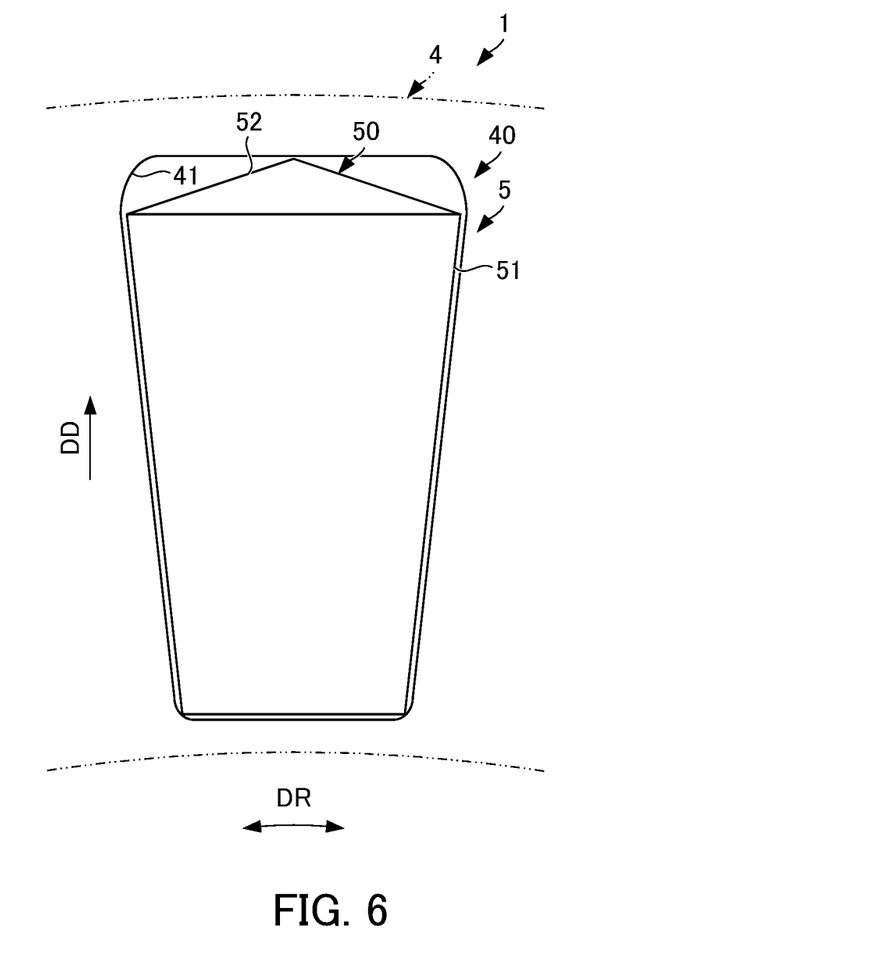
FIG. 6 is an enlarged view of a roller 50 received in a pocket 41 in the tapered roller bearing 1.

The tapered roller bearing 1 according to the first embodiment of the present invention is described with reference to FIG. 1. FIG. 1 is a lateral view of the tapered roller bearing 1 according to the first embodiment of the present invention. FIG. 2 is an exploded lateral view of FIG. 1. FIG. 3 is a vertical cross-sectional view of FIG. 1. FIG. 4 is an exploded vertical cross-sectional view of FIG. 1. FIG. 5 is a front view of the tapered roller bearing 1 according to the first embodiment, with an outer race 2 being omitted. FIG. 6 is an enlarged view of a roller 50 received in a pocket 41 in the tapered roller bearing 1. It is to be noted that in FIGS. 3 and 4, the roller 50 is shown in a lateral view, not in a cross-sectional view.

The tapered roller bearing 1 according to the first embodiment receives a thrust load (axial load) and a radial load, and is used in, for example, an automobile transmission or a windmill device. As shown in FIGS. 1 and 3, the tapered roller bearing 1 is inserted between a housing H1 which is a non-rotative member and a rotative member R1, and, under a thrust force and a radial force with respect to an axial direction along a rotation axis JX of the rotative member R1, smoothly supports rotation of the rotative member R1.

As shown in FIGS. 1 to 5, the tapered roller bearing 1 is provided with an outer race 2, an inner race 3, a retainer 4, and a roller group 5.

The outer race 2 is fixed to the housing H1 and serves as an external raceway surface (outer ring). More specifically, the outer race 2 has: a smaller cylindrical portion 20 which is relatively thick and relatively small in outer diameter and inner diameter; and a larger cylindrical portion 21 which is relatively thin and relatively great in outer diameter and inner diameter, in an integral manner. The outer race 2 has a raceway surface 2a which is tapered to follow the shape of a lateral face of the truncated conical shape, between an internal peripheral face 20a of the smaller cylindrical portion 20 and an internal peripheral face 21a of the larger cylindrical portion 21. It is to be noted that, in the example shown in FIGS. 3 and 4, the external peripheral face of the smaller cylindrical portion 20 and the internal peripheral face 21a of the larger cylindrical portion 21 are substantially aligned with each other in a radial direction DD; however, the present invention is not limited thereto. The internal peripheral face 21a may be greater than the external peripheral face of the smaller cylindrical portion 20 in the radial direction DD, and vice versa.

The raceway surface 2a is positioned to face the raceway surface 3a of the inner race 3, in a state of being tilted to one side (right side in FIGS. 1 to 4) with respect to a plane P1 perpendicular to a rotation axis JX by an angle $\theta 2$, and is thus paired with a raceway surface 3a of the inner race 3. The raceway surface 2a serves as a face (one of two faces) on which a plurality of rollers 50 constituting the roller group 5 rolls.

The inner race 3 is fixed to the rotative member R1 by means of the rotative member R1 in a stepped shaft-like shape being inserted to the internal peripheral side thereof, and thus serves as an internal raceway surface (inner ring). More specifically, the inner race 3 has: a cylindrical portion 30 inserted into the smaller cylindrical portion 20 of the outer race 2 from the side of the internal peripheral face 20a; and a flange portion 31, which is annular and provided at one end of the cylindrical portion 30, inserted into the larger cylindrical portion 21 of the outer race 2 from the side of the internal peripheral face 21a, in an integral manner. In the inner race 3, an external diameter of the cylindrical portion 30 is slightly smaller than an external diameter of the smaller cylindrical portion 20 of the outer race 2, while an external diameter of the flange portion 31 is slightly smaller than an external diameter of the larger cylindrical portion 21 of the outer race 2. The inner race 3 is thus capable of rotating about the rotation axis JX on the internal peripheral side of the outer race 2.

The inner race 3 has the raceway surface 3a which is tapered to follow the shape of a lateral face of the truncated conical shape, between an external peripheral surface 30a of the cylindrical portion 30 and a flange surface 31a on the side of the cylindrical portion 30 of the flange portion 31 (left side in FIGS. 1 to 4).

The raceway surface 3a is positioned to face the raceway surface 2a of the outer race 2, in a state of being tilted to the one side (right side in FIGS. 1 to 4) in a similar manner to the raceway surface 2a of the outer race 2 with respect to the plane P1 perpendicular to the rotation axis JX by an angle $\theta 3$, and is thus paired with the raceway surface 2a of the outer race 2. The angle $\theta 3$ is greater than the angle $\theta 2$ by which the raceway surface 2a is tilted ($\theta 3 > \theta 2$). The raceway surface 3a serves as a face (the another of the two faces) on which a plurality of rollers 50 constituting the roller group 5 rolls. In other words, the raceway surface 2a and the raceway surface 3a constitute a pair of raceway surfaces 2a, 3a.

The retainer 4 retains the plurality of rollers 5 constituting the roller group 5 between the pair of raceway surfaces 2a, 3a, and is in a plate-like shape having through holes for receiving the truncated conical shapes and annular in a front view. The retainer 4 is tilted to the one side (right side in FIGS. 1 to 4) in a similar manner to the raceway surface 2a of the outer race 2 and the raceway surface 3a of the inner race 3, with respect to the plane P1 perpendicular to the rotation axis JX by an angle $\theta 4$. The angle $\theta 4$ is greater than the angle $\theta 2$ by which the raceway surface 2a is tilted and less than the angle $\theta 3$ by which the raceway surface 3a is tilted ($\theta 2 < \theta 4 < \theta 3$).

The retainer 4 has a pocket group 40 that receives the rollers 50 constituting the roller group 5. The pocket group 40 is constituted of a plurality (18 in the present embodiment) of pockets 41 arranged at a regular interval along a circumferential direction DR of the retainer 4. As shown in FIGS. 5 and 6, the pockets 41 are each a through-hole with beveled corners in a trapezoidal shape, whose width increases from the inner side to the outer side in the radial direction DD of the roller 50, and are provided radially around the rotation axis JX.

As shown in FIGS. 1 to 5, an internal diameter of the retainer 4 is slightly greater than an external diameter of the cylindrical portion 30 of the inner race 3, while an external diameter of the retainer 4 is slightly smaller than the external diameter of the larger cylindrical portion 21 of the outer race 2. When the cylindrical portion 30 of the inner race 3 is inserted into the internal peripheral side of the retainer 4 and then the rollers 50 are respectively received by the pockets 41, while the retainer 4 is inserted into the side of internal peripheral face 21a of the larger cylindrical portion 21 of the outer race 2, the retainer 4 is interposed between the pair of raceway surfaces 2a, 3a and capable of rotating about the rotation axis JX on the internal peripheral side of the outer race 2 and the external peripheral side of the inner race 3.

The roller group 5 is constituted of a plurality (18 in the present embodiment) of rollers 50. The plurality of rollers 50 is supported between the pair of raceway surfaces 2a, 3a and arranged radially, in a state of being received by the pockets 41 of the retainer 4. The roller 50 has: a truncated circular conical roller body 51 having a diameter gradually increasing from the inner side toward the outer side in the radial direction DD of the roller 50; and a circular conical roller outer section 52 continuous with the outer side of the roller body 51 in the radial direction DD and tapered toward the outer side in the radial direction DD, in an integral manner.

As shown in FIGS. 5 and 6, the inner end of the roller 50 in the radial direction DD has: a surface profile conforming to the interior wall (interior wall on the inner side in the radial direction DD) of the pocket 41; and a structure not pivotally supported by the pocket 41, and is arranged along the interior wall of the pocket 41. The outer end of the roller 50 in the radial direction DD is in point contact with the interior wall (interior wall on the outer side in the radial direction DD) of the pocket 41. The expression "point contact" is not limited to geometric point-contact, but a broad concept encompassing any state that may be considered as "point-contact" within a range producing the effects of the invention. Furthermore, a rolling surface (lateral face of the roller body 51) of the roller 50 that is in contact with the pair of raceway surfaces 2a, 3a (see FIG. 4) during rolling of the roller 50 is arranged along the interior wall (interior wall along the circumferential direction DR) of the pocket 41.

As shown in FIGS. 1 to 5, when the cylindrical portion 30 of the inner race 3 is inserted into the internal peripheral side of the retainer 4 and then the rollers 50 are respectively received by the pockets 41, while the retainer 4 is inserted into the side of internal peripheral face 21a of the larger cylindrical portion 21 of the outer race 2, the roller 50 is interposed between the pair of raceway surfaces 2a, 3a and capable of revolving about the rotation axis JX and rotating in the pocket 41.

At least one of the outer race 2, the inner race 3, the retainer 4, and the roller group 5 preferably contains a resin. In the present embodiment, the outer race 2, the inner race 3, the retainer 4, and the roller group 5 each contain a resin. It is to be noted that an alternative mode may also be employed in which the retainer 4 and the roller group 5 contain a resin and the outer race 2 and the inner race 3 are constituted of a metal.

The resin is exemplified by a fluorocarbon resin such as PTFE, PFA and FEP. The resin is superior in various characteristics such as chemical resistance, electrical insulation property, heat resistance, low friction (self-lubricating property) and machinability, and, in comparison to metal, is suitable for the roller and the like of the tapered roller bearing according to the present invention. In particular, the fluorocarbon resin is preferred. It is required that at least an external peripheral surface of the roller 50 is formed from the resin. In such a case, the roller 50 may be formed by coating a metal core material with the resin. It is preferred that the roller 50 is entirely formed from the resin.

Effects of First Embodiment

The tapered roller bearing 1 according to the first embodiment produces the following effects, for example. The tapered roller bearing 1 according to the first embodiment includes: the plurality of rollers 50 arranged radially between the pair of raceway surfaces 2a, 3a tilted to one side relative to the plane P1 perpendicular to the rotation axis JX; and the retainer 4 disposed between the pair of raceway surfaces 2a, 3a and having the plurality of pockets 41 for receiving the rollers 50. The roller 50 has the roller body 51 having a truncated conical shape gradually increasing in diameter outwardly in the radial direction DD of the roller 50, and the roller outer section 52 having a conical shape continuous with the outer side of the roller body 51 in the radial direction DD and tapered outwardly in the radial direction DD, in which the inner end of the roller 50 in the radial direction DD has a shape conforming to the shape of the interior wall of the pocket 41 and is not pivotally supported by the pocket 41, and the outer end of the roller 50 in the radial direction DD is in point contact with the interior wall of the pocket 41.

Since the roller 50 has the roller body 51 having a truncated conical shape gradually increasing in diameter outwardly in the radial direction DD of the roller 50, a difference in peripheral velocity (peripheral velocity difference) between the internal periphery side and the external periphery side of the raceway surfaces 2a, 3a is hardly caused during use. As a result, slippage is hardly caused between the raceway surfaces 2a, 3a and the roller 50 on the external periphery side. Therefore, an increase in rotational resistance between the raceway surfaces 2a, 3a and the roller 50 due to slide friction, and an increase in friction of the roller 50 and the raceway surfaces 2a, 3a on the external periphery side can be minimized.

In addition, the inner end of the roller 50 in the radial direction DD has a shape conforming to the shape of the interior wall of the pocket 41 and is not pivotally supported by the pocket 41. As a result, the roller 50 has a simple structure without a shaft member for retaining the roller 50 at the inner end in the radial direction DD, and is stably supported by the interior wall of the pocket 41 on the inner side in the radial direction DD. Therefore, the roller 50 rotates smoothly.

Furthermore, the roller 50 has the roller outer section 52 having a conical shape continuous with the outer side of the roller body 51 in the radial direction DD and tapered outwardly in the radial direction DD. As a result, at the outer end in the radial direction DD, a contact area of the roller 50 with the interior wall of the pocket 41 on the outer side in the radial direction DD is minimized, and frictional resistance can thus be greatly reduced. Durability against a large load and durability against long-term use can thus be improved.

Moreover, in the tapered roller bearing 1 according to the first embodiment, at least the external peripheral surface of the roller 50 is formed from the resin. Therefore, a constitution can be employed in which a metal core material is disposed inside of the resin on the external peripheral surface. Overall strength of the roller 50 can thus be improved, while the aforementioned effects of the first embodiment are produced.

Finally, in the tapered roller bearing 1 according to the first embodiment, the roller 50 is entirely formed from the resin. The roller 50 can thus be produced only from the resin by simple processing, while the aforementioned effects of the first embodiment are produced.

Second Embodiment

Figure 7:
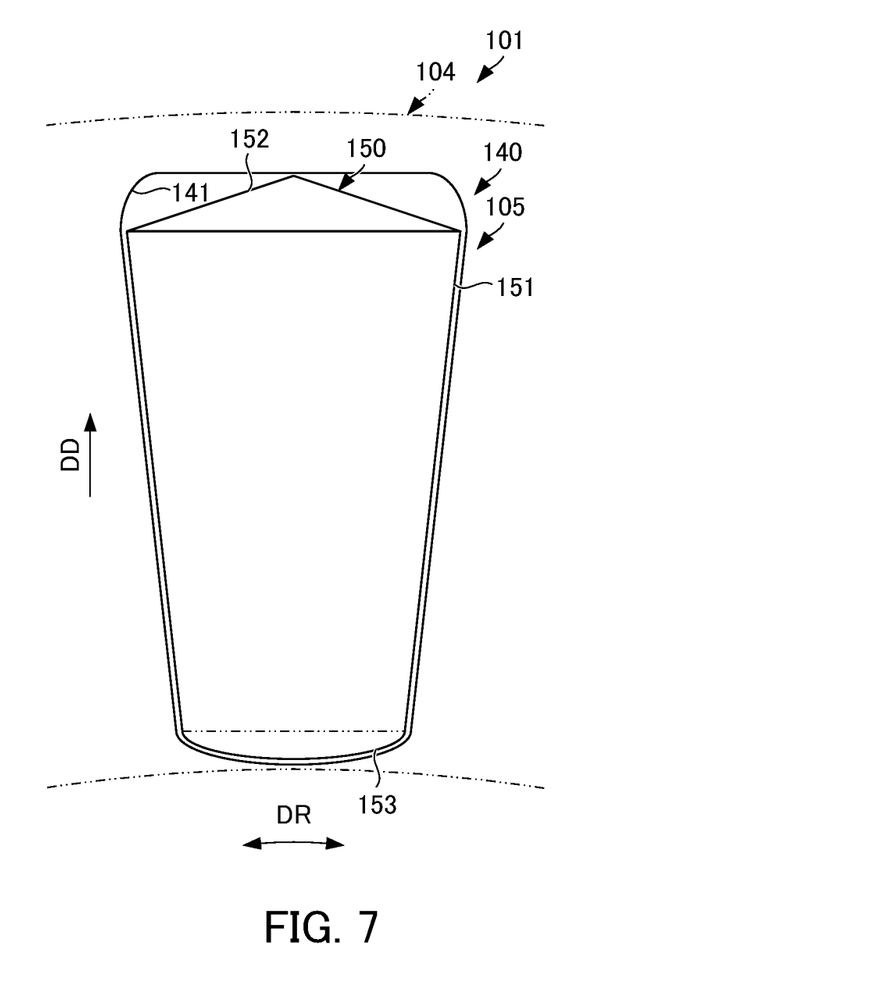
FIG. 7 is an enlarged view of a roller 150 received in a pocket 141 in a tapered roller bearing 101 according to a second embodiment of the present invention.

Hereinafter, the tapered roller bearing 101 according to the second embodiment of the present invention is described with reference to FIG. 7. FIG. 7 is an enlarged view of a roller 150 received in a pocket 141 in the tapered roller bearing 101 according to the second embodiment of the present invention. As for the second embodiment, differences from the first embodiment are mainly described. Components similar to those of the first embodiment are referred by the reference numerals incremented by 100. For the aspects not described for the second embodiment, the descriptions made for the first embodiment are employed as necessary. In addition, the second embodiment produces the same effects as the first embodiment.

As shown in FIG. 7, in the tapered roller bearing 101 according to the second embodiment, the interior wall on the inner side in the radial direction DD of the pocket 141 is different in shape from that of the pocket 41 (see FIG. 6) of the tapered roller bearing 1 according to the first embodiment. The pocket 141 is a through-hole having a trapezoidal shape, whose width increases from the inner side to the outer side in the radial direction DD of the roller 150, in which the inner end thereof in the radial direction DD expands to protrude (to be curved) inwards in the radial direction DD, and both corners on the outer side in the radial direction DD are beveled.

The roller group 105 is constituted of a plurality (18 in the present embodiment) of rollers 150. The roller 150 has the roller body 151 having a truncated conical shape gradually increasing in diameter outwardly in the radial direction DD of the roller, the roller outer section 152 having a conical shape continuous with the outer side of the roller body 151 in the radial direction DD and tapered outwardly in the radial direction DD, and a roller inner section 153 having a curved shape continuous with the inner side of the roller body 151 in the radial direction DD and protruding inwardly in the radial direction DD, in an integral manner.

The roller inner section 153 constituting the inner end of the roller 150 in the radial direction DD has: a curved profile conforming to the interior wall on the inner side in the radial direction DD of the pocket 141; and a structure not pivotally supported by the pocket 141, and is arranged along the interior wall of the pocket 141.

The tapered roller bearing 101 according to the second embodiment produces the same effects as the tapered roller bearing 1 according to the first embodiment. In addition, the roller 150 has the roller inner section 153 having a curved shape continuous with the inner side of the roller body 151 in the radial direction DD and protruding inwardly in the radial direction DD. As a result, the roller 50 is more stably supported by the interior wall of the pocket 41 on the inner side in the radial direction DD. Therefore, the roller 50 rotates more smoothly.

The preferred embodiments of the present invention have been described above. However, the present invention is not limited to the aforementioned embodiments, and may be implemented in various modes. The number of the pockets 41 constituting the pocket group 40 and the number of the rollers 50 constituting the roller group 5 are not limited. The shape of the inner end of the roller in the radial direction, i.e., the shape conforming the interior wall of the pocket, is not limited to the shape according to the first embodiment or to the shape according to the second embodiment.

EXPLANATION OF REFERENCE NUMERALS 1, 101 Tapered roller bearing
2a Raceway surface
3a Raceway surface
4, 104 Retainer
41, 141 Pocket
50, 150 Roller
51, 151 Roller body
52, 152 Roller outer section
JX Rotation axis
DD Radial direction

The invention claimed is:

1. A tapered roller bearing that receives a thrust load and a radial load derived from a rotation axis, comprising
   a plurality of rollers arranged radially between a pair of raceway surfaces tilted to one side relative to a plane perpendicular to the rotation axis,
   and a retainer disposed between the pair of raceway surfaces and having a plurality of pockets for receiving the rollers, wherein:
   the plurality of rollers each comprise a roller body having a truncated conical shape gradually increasing in diameter outwardly in a radial direction of the plurality of rollers, and a roller outer section having a conical shape continuous with an outer side of the roller body in the radial direction and tapered outwardly in the radial direction;
   an inner end of each of the plurality of rollers in the radial direction has a shape conforming to a shape of an interior wall of the pocket and is not pivotally supported by the pocket; and
   an outer end of each of the plurality of rollers in the radial direction is in point contact with the interior wall of the pocket.

2. The tapered roller bearing according to claim 1, wherein at least an external peripheral surface of each of the plurality of rollers is formed from a resin.

3. The tapered roller bearing according to claim 1, wherein the plurality of rollers is each entirely formed from a resin.

* * * * *